(12) United States Patent
Lee et al.

(10) Patent No.: US 12,177,045 B2
(45) Date of Patent: Dec. 24, 2024

(54) METHOD OF EQUALIZATION FOR HIGH-SPEED PROCESSING AND EQUALIZER THEREOF

(71) Applicant: ELECTRONICS AND TELECOMMUNICATIONS RESEARCH INSTITUTE, Daejeon (KR)

(72) Inventors: Seung-Woo Lee, Daejeon (KR); Sang Rok Moon, Daejeon (KR); Joon Ki Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 28 days.

(21) Appl. No.: 18/126,137

(22) Filed: Mar. 24, 2023

(65) Prior Publication Data

US 2023/0308318 A1  Sep. 28, 2023

(30) Foreign Application Priority Data

Mar. 28, 2022 (KR) .................. 10-2022-0037818

(51) Int. Cl.
*H04L 25/03* (2006.01)
*H04L 25/497* (2006.01)

(52) U.S. Cl.
CPC .. *H04L 25/03343* (2013.01); *H04L 25/03025* (2013.01); *H04L 25/497* (2013.01); *H04L 2025/0349* (2013.01)

(58) Field of Classification Search
CPC ......... H04L 25/03343; H04L 25/03057; H04L 25/03146; H04L 25/03025; H04L 25/4975;

(Continued)

(56) References Cited

U.S. PATENT DOCUMENTS 8,090,013 B2  1/2012  Farhoodfar et al.
8,233,522 B2  7/2012  Park et al.
(Continued)

FOREIGN PATENT DOCUMENTS

KR  10-0346530 B1  12/2002
KR  10-0495149 B1  9/2005
(Continued)

OTHER PUBLICATIONS

Seung-Woo Lee et al., "Demonstration of 200 Gbps PAM-4 transmission in a limited-bandwidth system using a two-tap THP with nonlinearity compensator" Available at SSRN 4017397 (Feb. 17, 2022).

*Primary Examiner* — Khanh C Tran
(74) *Attorney, Agent, or Firm* — LRK PATENT LAW FIRM (57) ABSTRACT

A method of equalization for high-speed processing and an equalizer thereof are proposed. The method of equalization includes determining a filter coefficient applied to a transmitter equalizer provided with a 2-tap precoder according to an approximate channel response characteristic, generating a pre-equalization signal by removing precursor ISI of a transmission feedback signal by the precoder to which the filter coefficient is applied, so as to output the pre-equalization signal as a transmitting signal, and receiving a transmission signal and generating an equalization signal by removing postcursor ISI of the received transmission signal by a receiver equalizer provided with a feedback filter having auxiliary coefficients for compensating for a difference between an overall channel response of the transmission signal and a channel response based on the precoder.

19 Claims, 9 Drawing Sheets

(58) Field of Classification Search
CPC ......... H04L 25/497; H04L 2025/03808; H04L 1/205; H04L 2025/0349
See application file for complete search history.

(56) References Cited

U.S. PATENT DOCUMENTS

| | | |
|---|---|---|
| 8,340,171 B2 | 12/2012 | Hovakimyan et al. |
| 8,724,687 B2 | 5/2014 | Bang et al. |
| 10,594,524 B1* | 3/2020 | Sedarat .............. H04L 25/03343 |
| 2003/0016770 A1* | 1/2003 | Trans ....................... H04B 3/32 |
| | | 375/346 |
| 2008/0232439 A1 | 9/2008 | Chen |
| 2009/0219984 A1* | 9/2009 | Taubin ............... H04L 25/03343 |
| | | 375/232 |
| 2010/0150264 A1* | 6/2010 | Taubin ................ H04L 25/4975 |
| | | 375/296 |

FOREIGN PATENT DOCUMENTS

| | | |
|---|---|---|
| KR | 10-0860503 B1 | 9/2008 |
| KR | 10-2009-0125118 A | 12/2009 |
| WO | 2010/004586 A1 | 1/2010 |

* cited by examiner

FIG. 1

RELATED ART

FIG. 2

RELATED ART

METHOD OF EQUALIZATION FOR HIGH-SPEED PROCESSING AND EQUALIZER THEREOF

CROSS REFERENCE TO RELATED APPLICATION

The present application claims priority to Korean Patent Application No. 10-2022-0037818, filed Mar. 28, 2022, the entire contents of which is incorporated herein for all purposes by this reference.

BACKGROUND OF THE INVENTION

1. Field of the Invention

The present disclosure relates to a method of equalization and an equalizer thereof and, more particularly, to a method of equalization and an equalizer thereof capable of reducing Inter-symbol Interference (ISI) due to bandwidth limitation and enabling high-speed processing by an optimized equalizer implemented therefor.

2. Description of Related Art

As internal traffic in data centers for cloud network services increases, short-distance optical links mainly required for use in the data centers require a transmission speed of 200 Gbps or more. In addition, research on this requirement has been actively reported. As for a competitive solution in the short-distance optical links, a Pulse Amplitude Modulation (PAM) method is widely used among Intensity Modulation/Direct Detection (IM/DD) methods. However, when low-cost electronic elements are used in such a PAM method, a bandwidth of a transmitter, a link (or a channel), or a receiver becomes insufficient. As one of distortion phenomena occurring in signals received through the channel, there occurs an Inter-symbol Interference (ISI) phenomenon. This phenomenon is caused by the fact that previous signals interfere with current signals due to an insufficient bandwidth in a transmission system, thereby resulting in signal distortion.

Figure 1:
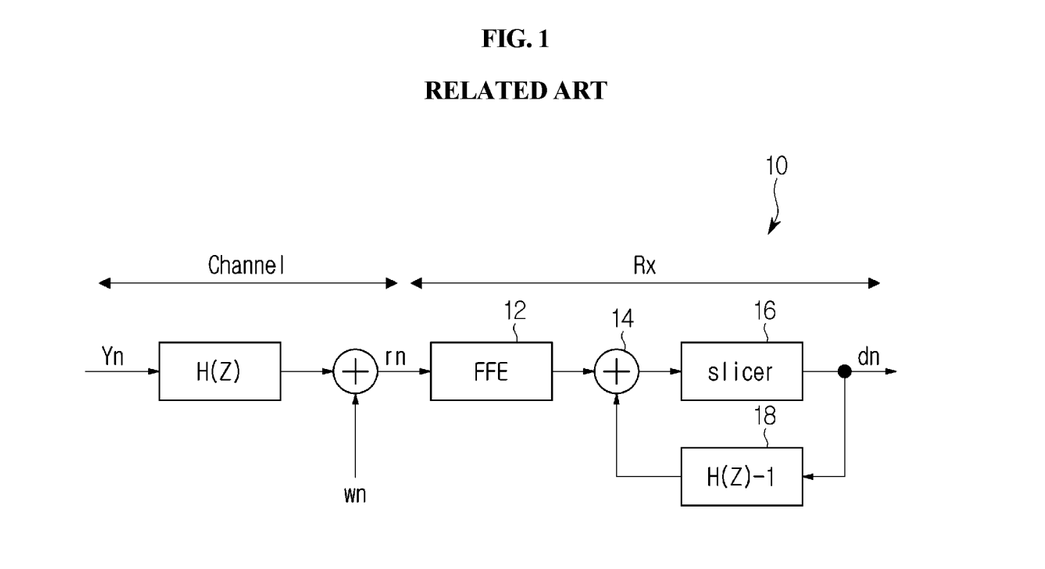
FIG. 1 is a block diagram of a receiving device including a conventional decision feedback equalizer.

In order to reduce the ISI caused by the bandwidth limitation, a receiving device is provided with an equalizer using an inverse function of a channel response function, so as to compensate and restore the received signals. As shown in FIG. 1, the receiving device uses a Feed Forward Equalizer (FFE) or a Decision Feedback Equalizer (DFE) to solve the ISI problem. FIG. 1 is a block diagram of the receiving device including a conventional decision feedback equalizer. The receiving device 10 include a feed forward filter 12, an adder 14, a slicer 16, and a decision feedback filter (i.e., a decision feedback equalizer) 18.

Figure 2:
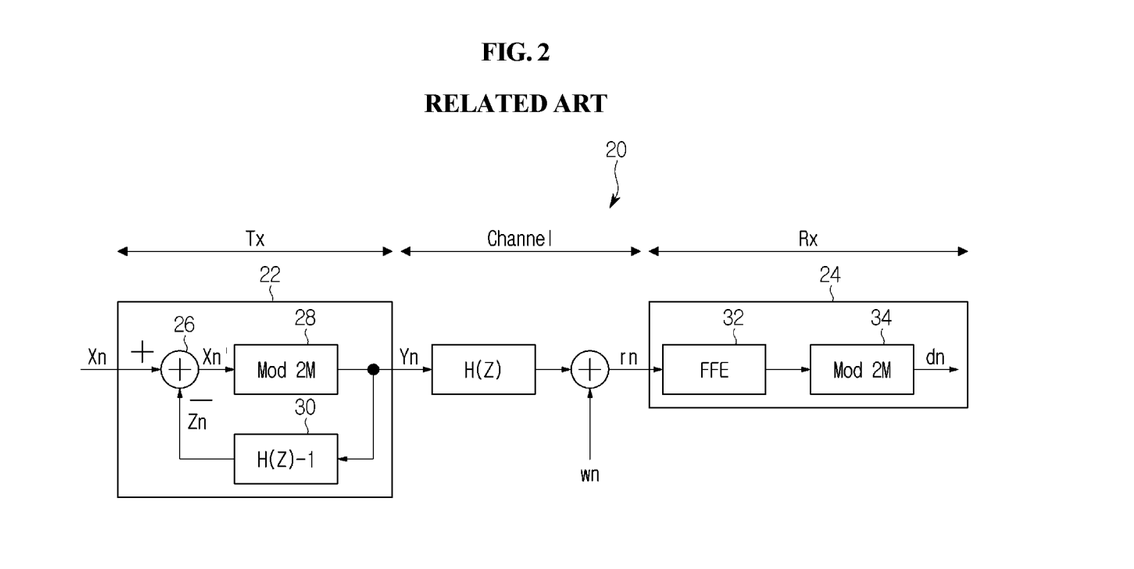
FIG. 2 is a block diagram of a transceiving system including a conventional precoder.

However, in a case where symbols or signals processed by the decision feedback equalizer 18 on the basis of the signals received from the slicer 16 are determined to be erroneous, the symbols give impacts on subsequent signals due to the decision feedback equalizer 18. This causes an error propagation problem, resulting in BER degradation of a system. To avoid the error propagation problem, Tomlinson-Harashima Precoding (THP) has been proposed as a method of implementing a decision feedback equalization function in a transmitting device. In a fundamental principle of operating the THP as a transmitter equalizer, similar to that of a receiver equalizer, ISI is removed by using the inverse function of the system's channel response, thereby restoring the received signals. FIG. 2 is a block diagram of a transceiving system including a conventional precoder. The transceiving system 20 includes: a transmitting device 22 for implementing a precoder; and a receiving device 24 for generating output signals by inputting signals. The transmitting device 22 may include an adder 26, a modulo operator 28, and a filter 30 implemented with THP. The receiving device 24 may be provided with a feed forward filter 32 and a modulo operator 34. Accordingly, a method of removing the ISI by using the conventional equalizer may be a method of using the decision feedback equalizer in the receiving device or a method of optimizing a filter coefficient of each tap for a channel response characteristic by using the THP in the transmitting device.

In a structure in which the decision feedback equalizer according to FIG. 1 is used or the THP according to FIG. 2 is used, filter coefficients are organized with multi taps, and before data transmission, the transmitting device transmits a training symbol (or a signal) to obtain a filter coefficient suitable for a channel response characteristic. After the training symbol is transmitted, a process of converging the filter coefficients is performed in the same manner as Least Mean Square (LMS). However, when the THP or decision feedback equalizer is used, it is essential to use feedback to a filter. In a case where the filter coefficients applied to the feedback are organized with the multi-taps, there are problems in that a delay time becomes long and high-speed processing is difficult in terms of hardware. In addition, when the equalizer of the transmitting device is configured with the THP, filter coefficient values of a filter, i.e., a feedback equalizer (FBE) for performing a feedback function in the decision feedback equalizer applied to the receiving device and multi-tap filter coefficients should be applied to the transmitting device in order to apply the filter coefficients optimized for channel response. In this case, the high-speed processing is difficult due to a hardware implementation problem of the above-described multi-tap feedback filter coefficients. In addition, the channel response of the receiving device is required to update the filter coefficients so that adaptive filter coefficients may be used. However, there is a problem that information on the filter coefficients should be frequently transmitted from the receiving device in order to update the adaptive filter coefficients implemented by the transmitting device.

SUMMARY OF THE INVENTION

An objective of the present disclosure for solving the technical problems is to provide a method of equalization and an equalizer thereof capable of reducing Inter-symbol Interference (ISI) due to bandwidth limitation and enabling high-speed processing by an optimized equalizer implemented therefor.

The technical problems to be achieved in the present disclosure are not limited to the technical problems mentioned above, and other technical problems that are not mentioned will be clearly understood by those skilled in the art to which the present disclosure belongs from the following description.

According to one aspect of the present disclosure, there is provided a method of equalization for high-speed processing, the method including: determining a filter coefficient applied to a transmitter equalizer provided with a 2-tap precoder according to an approximate channel response characteristic; generating a pre-equalization signal by removing precursor ISI of a transmission feedback signal by the precoder to which the filter coefficient is applied, so as to output the pre-equalization signal as a transmitting signal;

and receiving a transmission signal and generating an equalization signal by removing postcursor ISI of the received transmission signal by a receiver equalizer provided with a feedback filter having auxiliary coefficients for compensating for a difference between an overall channel response of the transmission signal and a channel response based on the precoder.

According to another aspect of the present disclosure, the precoder may include a pre-equalizer implemented with 2-tap Tomlinson-Harashima Precoding (THP).

According to a yet another aspect of the present disclosure, the approximate channel response characteristic may be a bandwidth of a system comprising the transmitter equalizer and the receiver equalizer, or is an auxiliary coefficient of a filter corresponding to a predetermined tap in the feedback filter for responding to a training signal from the transmitter equalizer, and the filter coefficient may be set to any one of a plurality of fixed values and determined as a fixed value closest to a value obtained based on the approximate channel response characteristic.

According to a still another aspect of the present disclosure, the filter coefficient may increase as the bandwidth related to the approximate channel response characteristic decreases, and decrease as the bandwidth increases.

According to a still another aspect of the present disclosure, the feedback filter of the receiver equalizer may be configured with a decision feedback equalizer having multi-tap filters, and the auxiliary coefficient may be set for each tap of the multi-tap filters on the basis of a training response signal transmitted from the transmitter equalizer in a state where the filter coefficient is determined.

According to a still another aspect of the present disclosure, the receiver equalizer may further include a maximum likelihood sequence estimator for receiving the equalization signal and generating an estimated equalization signal, and the method of equalization may further include outputting, as a final equalization signal by the receiver equalizer, either the equalization signal of the feedback filter or the estimated equalization signal of the maximum likelihood sequence estimator according to a bandwidth related to the approximate channel response characteristic.

According to a still another aspect of the present disclosure, in a case where the bandwidth related to the approximate channel response characteristic is smaller than that of a reference bandwidth, the final equalization signal may be output as the equalization signal of the feedback filter, and in a case where the bandwidth is greater than or equal to that of the reference bandwidth, the final equalization signal may be output as the estimated equalization signal.

According to a still another aspect of the present disclosure, the reference bandwidth may be determined based on a first correlation between the filter coefficient and a bit error rate (BER) for the equalization signal of the feedback filter and a second correlation between the filter coefficient and a BER for the estimated equalization signal of the maximum likelihood sequence estimator.

According to a still another aspect of the present disclosure, in the case where the bandwidth is smaller than that of the reference bandwidth, the filter coefficient may be determined based on the first correlation.

According to a still another aspect of the present disclosure, in the case where the bandwidth is greater than or equal to that of the reference bandwidth, the filter coefficient may be determined based on the second correlation.

According to another aspect of the present disclosure, there is provided a transmitter equalizer including a precoder, wherein the precoder may include: a single tap for receiving a transmission feedback signal based on an input signal; and a filter operator for generating a pre-equalization signal by filtering the transmission feedback signal and removing precursor ISI of the transmission feedback signal, and a filter coefficient to be applied to the filter operator may be determined according to an approximate channel response characteristic.

According to another aspect of the present disclosure, there is provided a receiver equalizer including a feedback filter, wherein the feedback filter may be composed of multi-tap filters, and generates an equalization signal by removing postcursor ISI of a transmission signal received from a transmitter equalizer provided with a 2-tap precoder using a filter coefficient, and an auxiliary coefficient of a filter operation applied to each multi-tap filter may be set to compensate for a difference between an overall channel response of the transmission signal and a channel response based on the transmitter equalizer.

Features briefly summarized above with respect to the present disclosure are only exemplary aspects of the detailed description of the present disclosure described below, and do not limit the scope of the present disclosure.

According to the present disclosure, there may be provided the method of equalization and the equalizer thereof capable of reducing Inter-symbol Interference (ISI) due to the bandwidth limitation and enabling the high-speed processing by the optimized equalizer implemented therefor.

Specifically, the transmitting device uses the 2-tap THP and the receiving device uses the decision feedback equalizer having the adaptive auxiliary filter coefficients, whereby a function for mitigating the Inter-symbol interference (ISI) phenomenon may be shared between the transmitting device and receiving device. Since the transmitting device does not use multi-taps but merely uses the 2-tap THP, the hardware implementation problem may be easily solved. That is, the equalizers for transmission and reception are designed as decision feedback equalizers respectively having the 2-tap THP and auxiliary coefficients, so that it is efficient in terms of a hardware configuration. In addition, by using the adaptive filter coefficients, filter coefficient values that is optimal for the channel response may be maintained.

In addition, in order to remove residual ISI that remains even with the applied 2-tap THP of the transmitting device, the receiving device may use the decision feedback equalizer having auxiliary coefficients. Accordingly, performance degradation caused by the ISI phenomenon due to the bandwidth limitation is maximally reduced, whereby the optimized equalizer may be configured.

In addition, the embodiment of the present disclosure may be composed of the precoder composed of the 2-tap THP and the decision feedback equalizer having the auxiliary coefficients, so that a BER performance result has an optimal value according to a bandwidth of an optical transmission system. By setting a THP coefficient on the basis of the bandwidth and also selecting a result from one of the decision feedback equalizer and the MLSE, the optimal performance may be maintained according to change in the bandwidth.

The effects of the present disclosure are not limited to the above-mentioned effects, and other different effects that are not mentioned will be clearly understood by those skilled in the art from the following description.

DETAILED DESCRIPTION OF THE INVENTION

Hereinafter, exemplary embodiments of the present disclosure will be described in detail with reference to the accompanying drawings so that those skilled in the art can easily implement the present disclosure. However, the present disclosure may be implemented in various different forms and is not limited to the exemplary embodiments described herein.

In describing the exemplary embodiment of the present disclosure, when it is determined that a detailed description of a known configuration or function may obscure the subject matter of the present disclosure, the detailed description thereof will be omitted. In addition, parts not related to the description of the present disclosure in the drawings are omitted, and similar reference numerals are used to similar parts.

In the present disclosure, when a component is said to be "connected", "coupled" or "linked" with another component, this may include not only a direct connection, but also an indirect connection in which another component exists in the middle therebetween. In addition, when a component "includes" or "has" other components, it means that other components may be further included rather than excluding other components unless the context clearly indicates otherwise.

In the present disclosure, terms such as first and second are used only for the purpose of distinguishing one component from other components, and do not limit the order, importance, or the like of components unless otherwise noted. Accordingly, within the scope of the present disclosure, a first component in one exemplary embodiment may be referred to as a second component in another exemplary embodiment, and similarly, a second component in one exemplary embodiment may also be referred to as a first component in another exemplary embodiment.

In the present disclosure, components that are distinguished from each other are intended to clearly describe each of their characteristics, and do not necessarily mean that the components are separated from each other. That is, a plurality of components may be integrated into one hardware or software unit, or one component may be distributed to be configured in a plurality of hardware or software units. Therefore, even when not stated otherwise, such integrated or distributed exemplary embodiments are also included in the scope of the present disclosure.

In the present disclosure, components described in various exemplary embodiments do not necessarily mean essential components, and some may be optional components. Accordingly, an exemplary embodiment consisting of a subset of components described in an exemplary embodiment is also included in the scope of the present disclosure. In addition, exemplary embodiments including other components in addition to the components described in the various exemplary embodiments are included in the scope of the present disclosure.

Hereinafter, exemplary embodiments of the present disclosure will be described with reference to the accompanying drawings.

Figure 3:
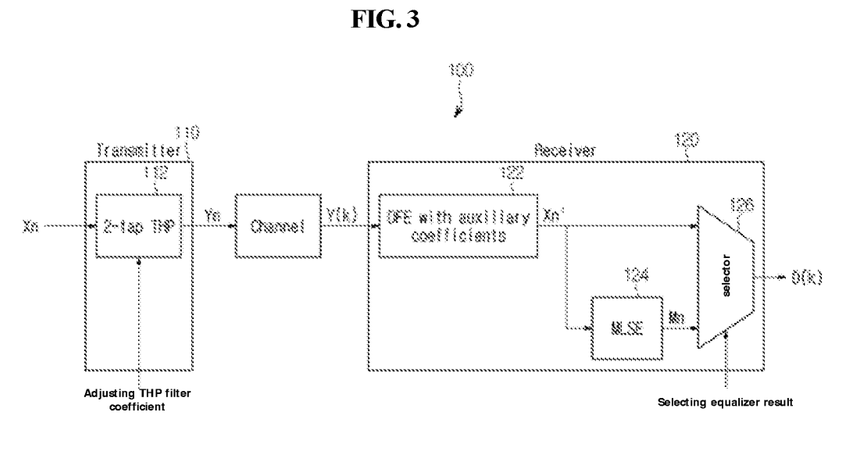
FIG. 3 is a block diagram of an optical transmission system including a transmitter equalizer and a receiver equalizer according to exemplary embodiments of the present disclosure.

FIG. 3 is a block diagram of an optical transmission system including a transmitter equalizer and a receiver equalizer according to exemplary embodiments of the present disclosure.

The optical transmission system 100 may include a transmitting device 110 for transmitting optical signals loaded with data and a receiving device 120 for receiving the optical signals passing through an optical link channel.

The transmitting device 110 (hereinafter, used interchangeably with the transmitter) may be provided with a 2-tap precoder 112 for serving as a pre-equalizer. The precoder 112 may include 2-tap THP. In the present disclosure, the precoder 112 configured with the 2-tap THP may be, for example, a transmitter equalizer. A tap of the precoder 112 may have a filter coefficient, and the filter coefficient may be determined based on an approximate channel response characteristic. The transmitter equalizer may remove a precursor ISI of a transmission feedback signal by the precoder 112 to which the filter coefficient is applied, so as to generate a pre-equalization signal, thereby outputting the pre-equalization signal as a transmission signal.

The filter coefficient of the precoder 112 may be determined according to the transmitting device 110, the receiving device 120, and the approximate channel response characteristic related to the channel. The approximate channel response characteristic may be characteristic data briefly obtained in relation to the transmitting device 110 and the receiving device 120. The approximate channel response characteristic may be estimated from, for example, a bandwidth of the optical transmission system 100 including the transmitting device 110 and the receiving device 120 or a specific filter coefficient in the receiver equalizer. The filter coefficient is set to any one of a plurality of fixed values, and may be a fixed value closest to a value obtained based on the approximate channel response characteristic.

In a case where an approximate channel response characteristic is estimated from, for example, a bandwidth, a filter coefficient of the THP may increase as the bandwidth decreases, and the filter coefficient of the THP may decrease as the bandwidth increases. In addition, a selector 126 of the receiving device 120 may select an output signal of the decision feedback equalizer 122 when the bandwidth is insufficient, but in contrast, may select an output signal of a maximum likelihood sequence estimator 124 when the bandwidth is sufficient.

The receiving device 120 (hereinafter, used interchangeably with the receiver) is a main module, and may include: a feedback filter 122 composed of multi-tap filters and configured to remove postcursor ISI of an equalization signal received from the transmitter equalizer; a maximum likelihood sequence estimator (MLSE) 124; and a selector 126. In the present disclosure, for example, the receiver equalizer may be configured to include the above-described modules 122, 124, and 126 of the receiving device 120.

For example, the feedback filter 122 of the receiver equalizer may be configured with a decision feedback equalizer (DFE) having auxiliary coefficients applied to respective multi-tap filters. The auxiliary coefficients are coefficients applied to filter operations of the multi-tap filters, and may be set to compensate for a difference between an overall channel response of a transmission signal and a channel response based on the transmitter equalizer. For example, an auxiliary coefficient may be set for each tap of the multi-tap filters on the basis of a training response signal transmitted from the transmitter equalizer in a state in which a filter coefficient of the precoder 112 is determined.

Figure 4:
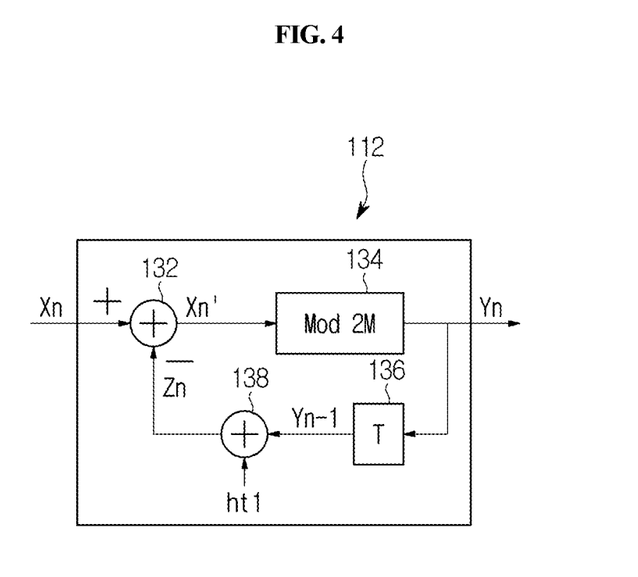
FIG. 4 is a block diagram of the transmitter equalizer according to an exemplary embodiment of the present disclosure.

FIG. 4 is a block diagram of the transmitter equalizer according to an exemplary embodiment of the present disclosure.

The precoder 112 for serving as an equalizer of the transmitting device 110 may include: an adder 132; a modulo operator 134; a tap 136 applied to the precoder 112; and one multiplier 138 for multiplying a filter coefficient ht1 by a transmission feedback signal that is input to the tap 136. Accordingly, the precoder 112 may be implemented with 2-tap THP by using only a single filter.

Figure 5:
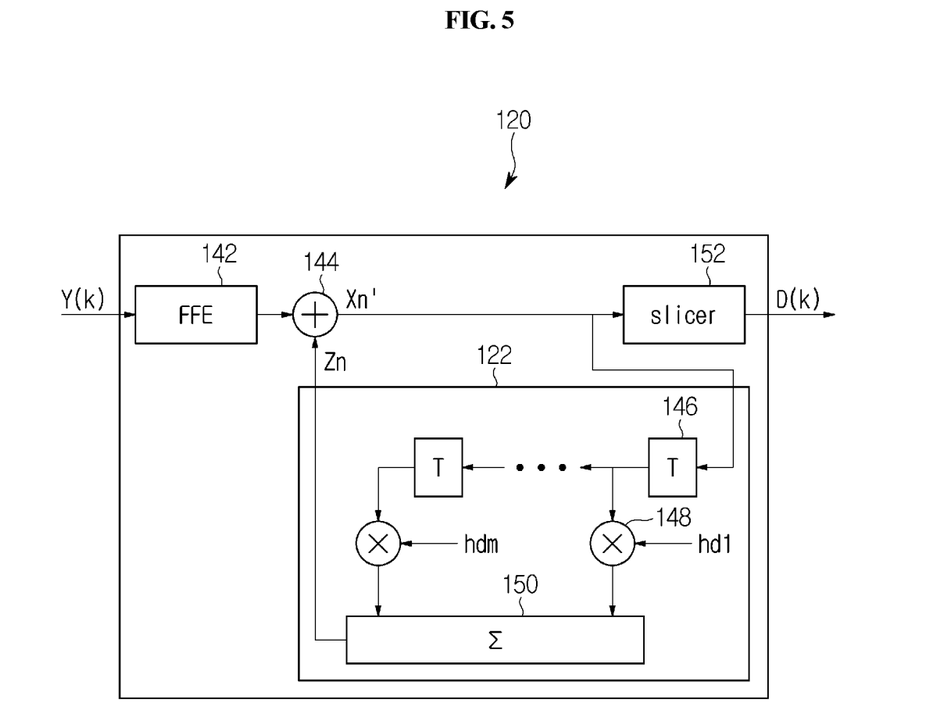
FIG. 5 is a block diagram of the receiver equalizer according to another exemplary embodiment of the present disclosure.

FIG. 5 is a block diagram of the receiver equalizer according to another exemplary embodiment of the present disclosure.

The receiving device 120 may be provided with a feed forward filter 142, an adder 144, a feedback filter 122, and a slicer 152. In this case, although the maximum likelihood sequence estimator 124 and the selector 126 are omitted from here, the point that the maximum likelihood sequence estimator 124 and the selector 126 are included as components of the receiver equalizer in connection with FIG. 3 may be sufficiently understood. That is, the receiver equalizer may be configured to include the feed forward filter 142, the adder 144, the feedback filter 122, the slicer 152, the maximum likelihood sequence estimator 124, and the selector 126.

The feedback filter 122 serves as the decision feedback equalizer, and may include: delay taps 146 configured with multi taps in consideration of primary ISI removal due to the precoder 112; multipliers 148 for multiplying output signals, which are transmitted from the delay taps 146, by respective auxiliary coefficients hd1 to hdm; and an adder 150 for summarizing values of the respective multipliers 148.

Hereinafter, with reference to FIGS. 6 and 7, a method of equalization using a receiver equalizer and a precoder 112 that is a transmitter equalizer described in FIGS. 4 and 5 will be described.

Figure 6:
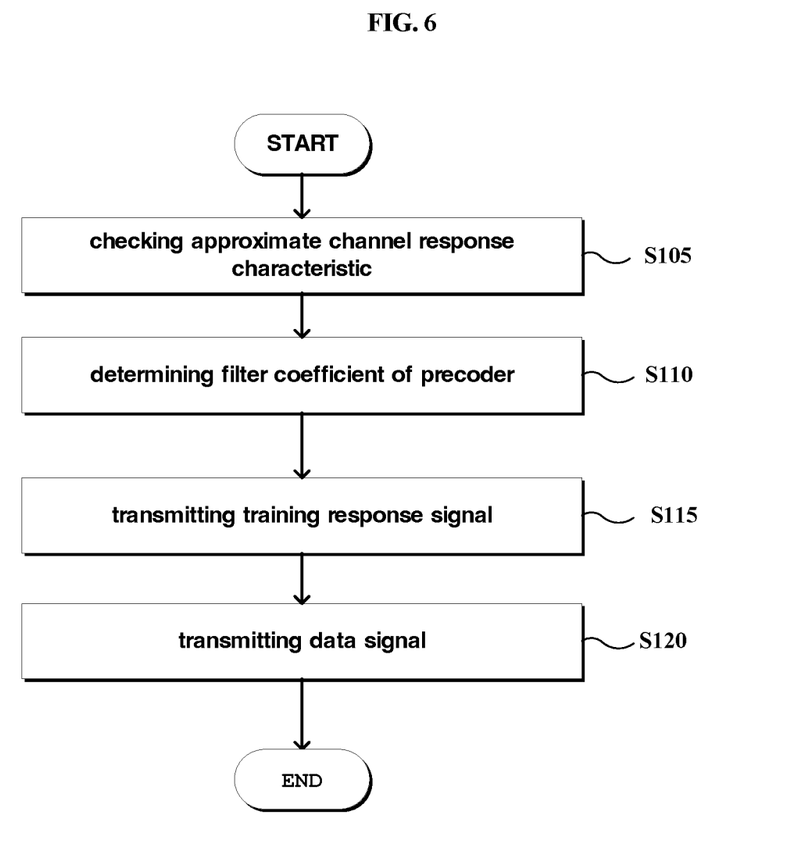
FIG. 6 is a flowchart of a method of equalization in a transmitter equalizer according to a yet another exemplary embodiment of the present disclosure.

FIG. 6 is a flowchart of the method of equalization in the transmitter equalizer according to a yet another exemplary embodiment of the present disclosure.

First, in step S105, a transmitting device 110 may check approximate channel response characteristics related to the transmitting device 110, a receiving device 120, and a channel.

The approximate channel response characteristics may be characteristic data briefly obtained in relation to the transmitting device 110 and the receiving device 120. For example, an approximate channel response characteristic may be estimated from, for example, a bandwidth of an optical transmission system 100 including the transmitting device 110 and the receiving device 120, or may be a specific filter coefficient in the receiver equalizer.

As an example, as for the bandwidth of the system 100, a 3-dB bandwidth is calculated by measuring a frequency response to a transmission signal applied to a channel from the transmitting device 110, and the calculated 3-dB bandwidth may be adopted as the bandwidth of the system 100. As another example, a bandwidth of the system 100 may be calculated by a minimum value obtained from among 3-dB bandwidths of electrical elements or optical elements, which are used in the transmitter and the receiver. In addition, an approximate channel response characteristic may be estimated from a filter coefficient value of the receiver rather than from the bandwidth of the system 100. For example, the transmitting device 110 transmits a training signal (or a training symbol) to the receiving device 120, and may obtain the filter coefficient value of a predetermined tap, e.g., a first tap, of the feedback filter 122, the filter coefficient value being received from the receiving device 120. The approximate channel response characteristic may also be estimated by the obtained filter coefficient.

Next, in step S110, a precoder 112 may determine a filter coefficient ht1 on the basis of the approximate channel response characteristic.

For example, the filter coefficient is set to any one of a plurality of fixed values, and may be set as a fixed value closest to a value obtained based on the approximate channel response characteristic. Here, the plurality of fixed values may be any one of 0.1 to 0.9.

In detail, in a THP structure of the precoder 112, the 2-tap THP may be implemented by using merely one of filter coefficients of the multi taps. The filter coefficients may be organized such that each value thereof is determined from among 0.1 to 0.9, which are predetermined values. An input signal Xn is added using an adder 132 to a result value Zn obtained by multiplying a fed-back output value Yn of a modulo operator 134 by the filter coefficient ht1, and a calculated result Xn' is applied to the modulo operator 134. A value of the filter coefficient ht1 used in this case is related to a channel response, and may be set to a fixed constant value closest to the value obtained based on the approximate channel response characteristic. For example, ht1 may be set to have one from among values such as 0.1, 0.2, . . . , and 0.9. A filter function used in the above 2-tap THP may be expressed as Equation 1.

$$Zn = ht1 * Yn-1 \qquad \text{[Equation 1]}$$

Figure 10:
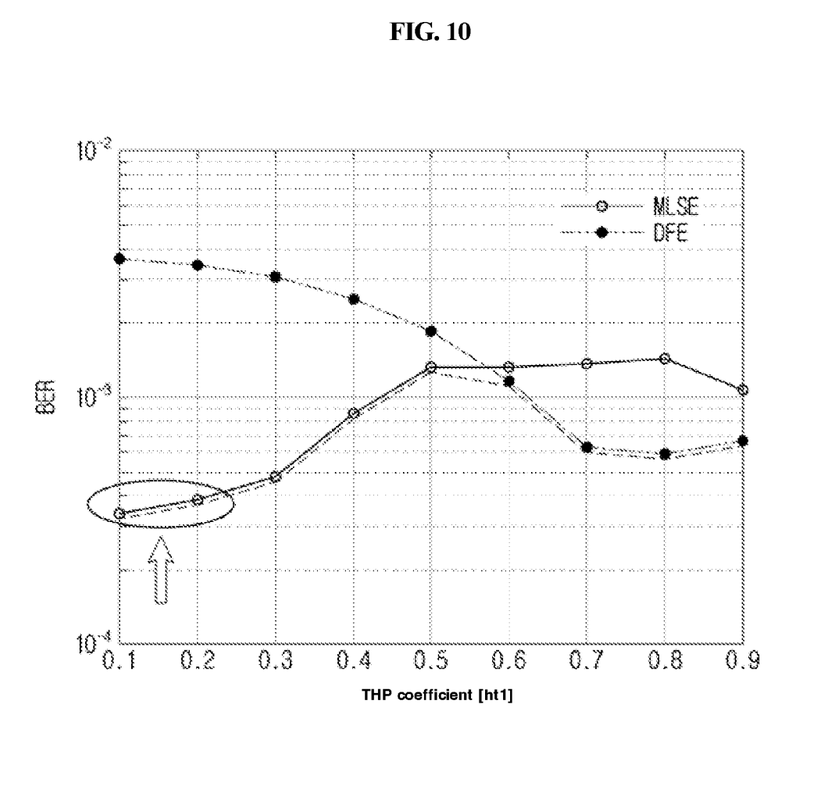
FIG. 10 is a view illustrating generating optimization of BERs of the MUSE and the decision feedback equalizer according to the change of the 2-tap THP coefficient when a bandwidth is sufficient.
Figure 11:
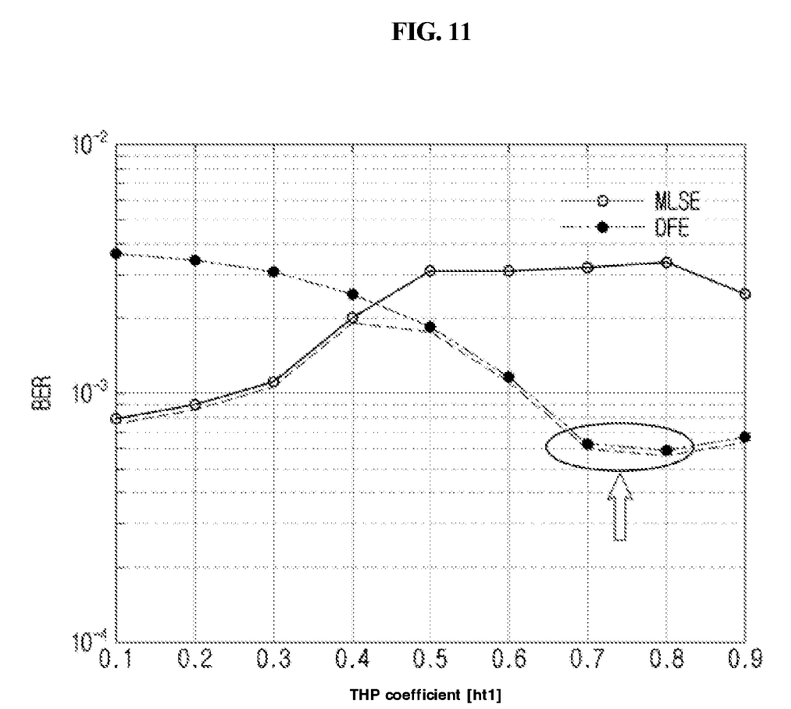
FIG. 11 is a view illustrating generating optimization of BERs of the MLSE and the decision feedback equalizer according to the change of the 2-tap THP coefficient when the bandwidth is insufficient.

As illustrated in FIGS. 10 and 11 described later, in a case where an approximate channel response characteristic is a bandwidth of a system 100, a filter coefficient ht1 may be selected as a fixed value correlated with the bandwidth of the system 100. In a case where an approximate channel response characteristic is a filter coefficient value in a feedback filter 122 of a receiver equalizer responded by a training signal, for example, a value of a filter coefficient of a first tap of the feedback filter 122, a filter coefficient ht1 may be set to a fixed value closest to the filter coefficient value of the first tap. The filter coefficient ht1 may be provided as a fixed value without being changed during a process of transmitting a transmission signal.

The conventional THP structure uses multi-tap filter coefficients, and filter coefficient values are used according to channel response characteristics. According to the present disclosure, the transmitter equalizer 112 has the following strong points. The 2-tap THP does not require estimation of accurate channel response and channel feedback. In addition, only 2-tap THP is applied, so design complexity is very low and hardware implementation for high-speed processing is available.

Next, in step S115, the transmitting device 110 may receive the training signal for setting an auxiliary coefficient from the receiving device 120 and transmit a training response signal.

The transmitting device 110 may transmit, for example, bandwidth information of the system 100 or information related to the filter coefficient ht1 of the precoder 112 to the receiving device 120 together with the training response signal.

Next, in step S120, by using the filter coefficient ht1 to remove precursor ISI to data signal, the precoder 112 may generate a pre-equalization signal and transmit a data signal, i.e., a transmission signal, which is based on the pre-equalization signal, to the receiving device 120. The removal of the precursor ISI may refer to an act of removing or mitigating at least a portion of the precursor ISI of the signal.

Figure 7:
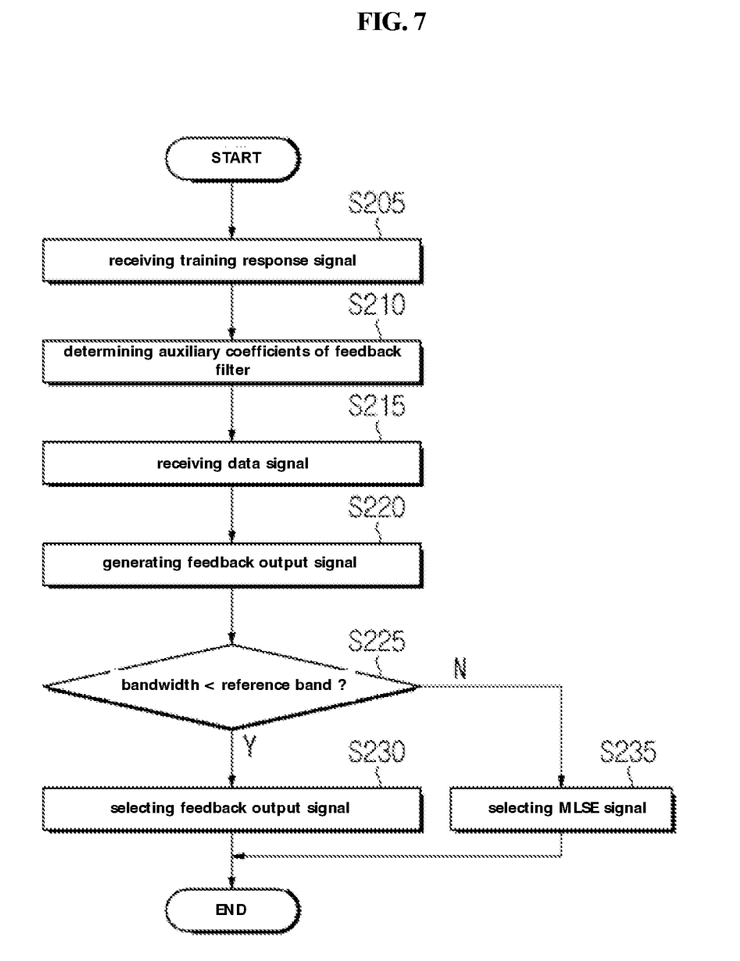
FIG. 7 is a flowchart of the method of equalization in a receiver equalizer according to the yet another exemplary embodiment of the present disclosure.

FIG. 7 is a flowchart of a method of equalization in the receiver equalizer according to the yet another exemplary embodiment of the present disclosure.

First, in step S205, the receiving device 120 may receive the training response signal transmitted from the transmitting device 110.

The receiving device 120 may receive, for example, bandwidth information of the system 100 or information related to the filter coefficient ht1 of the precoder 112 together with the training response signal to the receiving device 120.

Next, in step S210, the feedback filter 122 may determine an auxiliary coefficient to be applied to a transmission signal on the basis of the training response signal.

The decision feedback equalizer 122 may determine auxiliary coefficients, e.g., hd1 to hdm, applied to respective delay taps 146 configured with multi taps on the basis of the training response signal.

Even when pre-equalization is configured merely with the 2-tap THP of the precoder 112, residual ISI is still present. An additional equalizer design is required to mitigate the residual ISI. Accordingly, in the present disclosure, a feedback equalizer having auxiliary coefficients may be provided in the receiver. By operating together with the 2-tap THP having fixed filter coefficient values, residual postcursor ISI not removed by the THP may be adaptively compensated.

In a state where the transmitter has a filter coefficient ht1 of the THP as a fixed value, the transmitter may transmit the training signal (or the training symbol) before transmitting data so that the receiver receives the training response signal, and may calculate the auxiliary coefficient of the filter by using a method such Least Mean Square (LMS) using the training response signal. Thus, the decision feedback equalizer 122 having the auxiliary coefficients may operate to compensate for misadjustments sufficiently adaptively, which may be caused by the fixed coefficient values of the 2-tap THP for an actual channel. Accordingly, a magnitude of the auxiliary coefficient of a feedback portion may be reflected by compensating for a difference between the overall channel response at a given point in time and the channel response that is a basis of the 2-tap THP. When an input of a received signal has an error occurring in the feedback equalizer of the receiver, the overall Bit Error Rate (BER) may include an error propagation problem. In this regard, the decision feedback equalizer 122 having the 2-tap THP and auxiliary coefficients may be used to select coefficient values sufficient to eliminate ISI (or postcursor ISI), thereby having effects of maintaining the feedback coefficients small and mitigating the error propagation problem.

The filter function used in the decision feedback equalizer 122 having such auxiliary coefficients can be expressed as Equation 2. The auxiliary coefficients in Equation 2 are expressed as hd1, hd2, . . . , and hdm, and may be set for respective delay taps 146.

$$Zn = hd1*X'n-1 + hd2*X'n-2 + \ldots + hdm*X'n-m \quad \text{[Equation 2]}$$

Next, in step S215, the receiver equalizer may receive a data signal from the transmitting device 110.

The data signal may be the transmission signal mentioned in step S120. The transmission signal may be a pre-equalization signal including actual data and from which precursor ISI is removed by the precoder 112. In step S215 instead of step S205, the receiver equalizer transmits, for example, bandwidth information of the system 100 or information related to the filter coefficient ht1 of the precoder 112 together with the transmission signal to the receiving device 120.

Next, in step S220, the feedback filter 122 having the determined auxiliary coefficients may generate a feedback output signal by removing postcursor ISI of the received transmission signal. The feedback output signal may be a kind of equalization signal.

Next, in step S225, the receiver equalizer may determine whether the bandwidth of the system 100 is smaller than that of a reference bandwidth.

For example, as in steps S205 or S215, the bandwidth of the system 100 may be received as corresponding information. As another example, the receiver equalizer may compare the bandwidth of the system 100 with the reference bandwidth on the basis of the filter coefficient ht1 of the precoder 112.

When the bandwidth is smaller than that of the reference bandwidth, the receiver equalizer may select the feedback output signal of the decision feedback equalizer 122 as a final equalization signal by the selector 126 in step S230.

The reference bandwidth may be determined based on correlations illustrated in FIGS. 8 to 11 to be described later. As shown in FIGS. 8 to 11, in a case where the THP coefficient ht1 has values of 0.6 to 0.9, which are large values, it may be confirmed that a first correlation between the filter (i.e., the THP) coefficient ht1 and bit error rates (BERs) for the equalization signal of the feedback filter 122 shows that outputs of the decision feedback equalizer 122 have better BER values than those of the MLSE. In a case where the THP coefficient ht1 has values of 0.1 to 0.4, which are small values, it may be confirmed that a second correlation between the filter (i.e., the THP) coefficient and BERs for an estimated equalization signal of the maximum likelihood sequence estimator shows that outputs of the MLSE have better BER values than those of the decision feedback equalizer 122. Accordingly, an output signal to be adopted as the final equalization signal may be determined based on 0.5 that is a filter coefficient ht1 value of the precoder 112. The receiver equalizer may calculate a bandwidth corresponding to the filter coefficient ht1 value of 0.5, and the corresponding bandwidth may be determined as a reference bandwidth. The receiver equalizer may, for example, compare the received bandwidth with the reference bandwidth. In another example, the receiver equalizer may compare ht1, which is information on the received filter coefficient, with a reference value (i.e., 0.5 in the examples of FIGS. 8 to 11) to estimate a result of the comparison between the bandwidth and that of the reference bandwidth.

In a case where a bandwidth is greater than that of the reference bandwidth, the receiver equalizer may select, as the final equalization signal by the selector 126, an output signal of the maximum likelihood sequence estimator 124 in step S235.

The maximum likelihood sequence estimator 124 may generate an estimated equalization signal on the basis of the output signal of the decision feedback equalizer 122. Specifically, the MLSE may be configured with a nonlinear equalizer for estimating a sequence of symbols implemented with channel estimation and the Viterbi algorithm for the output signals of the decision feedback equalizer 122. The Viterbi algorithm may be used to find the most probable sequence by searching a state trellis.

Hereinafter, referring to FIGS. 8 to 11, a process of selecting, by the selector 126, an output signal according to the filter coefficient of the precoder 112 and the bandwidth will be exemplarily described.

Figure 8:
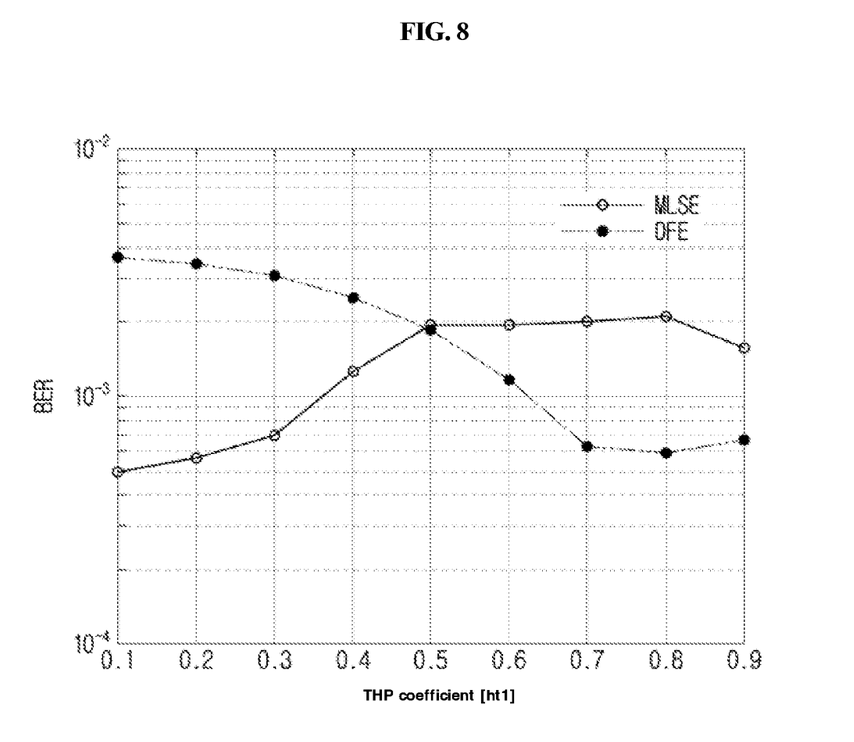
FIG. 8 is a view illustrating a graph of a correlation between BER result values of an MLSE and a decision feedback equalizer according to change in a 2-tap THP coefficient.
Figure 9:
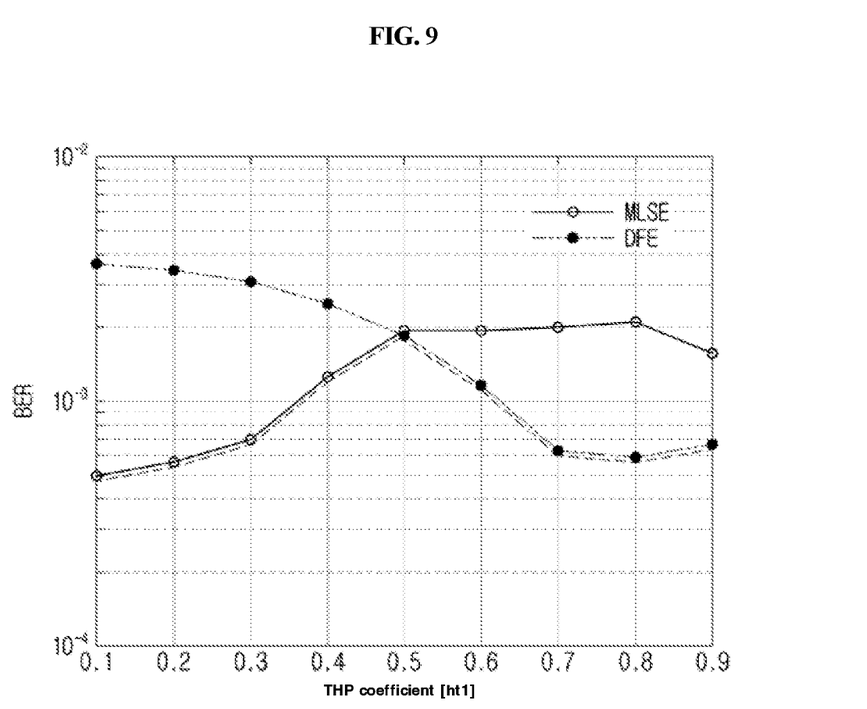
FIG. 9 is a view illustrating generating optimization of BERs of the MLSE and the decision feedback equalizer according to the change of the 2-tap THP coefficient.

FIG. 8 is a view illustrating a graph of a correlation between BER result values of the MLSE and decision feedback equalizer according to change of the 2-tap THP coefficient. FIG. 9 is a view illustrating calculating optimization of BERs of the MLSE and the decision feedback equalizer according to the change of the 2-tap THP coefficient.

In a case where the THP coefficient has small values (i.e., ht1 has values of 0.1 to 0.4), outputs of the MLSE may have better BER values than those of the decision feedback equalizer. In a case where the THP coefficient has large values (i.e., ht1 has values of 0.6 to 0.9), outputs of the decision feedback equalizer have better BER values than those of the MLSE. In the case where the THP coefficient values are small, the ISI phenomenon is not greatly mitigated due to the THP, so it may be assumed that an effect of removing residual ISI occurs by the MLSE. Accordingly, the outputs of the MUSE may result in better BER performance than that of the decision feedback equalizer. Whereas, when the THP coefficient has large values, it may be inferred that the ISI problem is no longer improved by the MLSE because the ISI problem is sufficiently mitigated by the THP. Accordingly, as shown in the dotted line in FIG. 9, when the filter coefficient of the precoder 112 has the small values, the outputs of the MLSE are selected, and when the filter coefficient has the large values, the outputs of the decision feedback equalizer are selected, whereby the outputs may be determined, so as to maintain optimal BERs. In this way, according to the filter coefficient of the precoder 112 or the bandwidth corresponding thereto, an output signal of either the decision feedback equalizer 122 or the maximum likelihood sequence estimator 124 is selected and output as a final equalization signal. Specifically, the final equalization signal may be determined by comparing the filter coefficient ht1 values of the precoder 112 with the reference filter coefficient value (e.g., 0.5) or by comparing the corresponding bandwidth of the system 100 with the corresponding reference bandwidth.

FIG. 10 is a view illustrating calculating optimization of the BERs of the MLSE and the decision feedback equalizer according to the change of the 2-tap THP coefficient when a bandwidth is sufficient.

The case where the THP coefficient has the low values (0.1 to 0.4) may have the better BER values than those of the case where the THP coefficient has the high values (i.e., ht1 has the values of 0.6 to 0.9). Accordingly, in a case where the bandwidth is sufficient, a THP coefficient value is set to a fixed constant value of any one of 0.1 to 0.4, which are the low values, on the basis of the bandwidth of the system 100 or the filter coefficient values of the receiver, and also the receiver equalizer may select the outputs of the MLSE.

FIG. 11 is a view illustrating calculating optimization of BERs of the MLSE and the decision feedback equalizer according to the change of the 2-tap THP coefficient when the bandwidth is insufficient.

The BERs of the case where the THP coefficient has the high values (i.e., ht1 has the values of 0.6 to 0.9) are better than those of the case where the THP coefficient has the low values (i.e., ht1 has the values of 0.1 to 0.4). Therefore, in the case where the bandwidth is insufficient, a THP coefficient value is set to a fixed constant value of any one of 0.6 to 0.9, which are the high values, on the basis of the bandwidth of the system 100 or the filter coefficient values of the receiver, and also the receiver equalizer may select the outputs of the decision feedback equalizer 122.

Summarizing with respect to FIGS. 10 and 11, the reference bandwidth for defining whether the bandwidth is large or small may be determined based on the first correlation between the BERs for the filter coefficient and the output signal of the decision feedback filter and the second correlation between the BERs for the filter coefficient and the output signal of the maximum likelihood series estimator. In addition, in the case where the bandwidth of the system 100 is smaller than that of the reference bandwidth, the filter coefficient may be determined based on the first correlation. In the case where the bandwidth of the signal is larger than that of the reference bandwidth, the filter coefficient may be determined based on the second correlation.

Exemplary methods of the present disclosure are presented as a series of operations for clarity of explanation, but this is not intended to limit the order in which steps are performed, and when required, each step may be performed concurrently or in a different order. In order to implement the method according to the present disclosure, other steps may be included in addition to the exemplified steps, other steps may be included except for some steps, or additional other steps may be included except for some steps.

The various exemplary embodiments of the present disclosure are intended to describe representative aspects of the present disclosure, rather than listing all possible combinations, and matters described in the various exemplary embodiments may be applied independently or in combination of two or more.

In addition, various exemplary embodiments of the present disclosure may be implemented by hardware, firmware, software, a combination thereof, etc. The implementation by hardware may be realized by means of one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general-purpose processors (i.e., general processors), controllers, microcontrollers, microprocessors, or the like.

The scope of the present disclosure includes: software or machine-executable instructions (e.g., operating systems, applications, firmware, programs, etc.) that cause operations according to the methods of various exemplary embodiments to be executed on a device or computer; and a non-transitory computer-readable medium in which such software or instructions are stored and executable on a device or computer.

What is claimed is:

1. A method of equalization for high-speed processing, the method comprising:
   determining a filter coefficient applied to a transmitter equalizer provided with a 2-tap precoder according to an approximate channel response characteristic;
   generating a pre-equalization signal by removing precursor inter-symbol interference (ISI) of a transmission feedback signal by the precoder to which the filter coefficient is applied, so as to output the pre-equalization signal as a transmitting signal; and
   receiving a transmission signal and generating an equalization signal by removing postcursor ISI of the received transmission signal by a receiver equalizer provided with a feedback filter having auxiliary coefficients for compensating for a difference between an overall channel response of the transmission signal and a channel response based on the precoder.

2. The method of claim 1, wherein the precoder comprises a pre-equalizer implemented with 2-tap Tomlinson-Harashima Precoding (THP).

3. The method of claim 1, wherein the approximate channel response characteristic is a bandwidth of a system comprising the transmitter equalizer and the receiver equalizer, or is an auxiliary coefficient of a filter corresponding to a predetermined tap in the feedback filter for responding to a training signal from the transmitter equalizer, and
   the filter coefficient is set to any one of a plurality of fixed values and determined as a fixed value closest to a value obtained based on the approximate channel response characteristic.

4. The method of claim 3, wherein the filter coefficient increases as the bandwidth related to the approximate channel response characteristic decreases, and decreases as the bandwidth increases.

5. The method of claim 1, wherein the feedback filter of the receiver equalizer is configured with a decision feedback equalizer having multi-tap filters, and
   the auxiliary coefficient is set for each tap of the multi-tap filters on the basis of a training response signal transmitted from the transmitter equalizer in a state where the filter coefficient is determined.

6. The method of claim 1, wherein the receiver equalizer further comprises a maximum likelihood sequence estimator for receiving the equalization signal and generating an estimated equalization signal, and
   the method of equalization further comprises:
   outputting, as a final equalization signal by the receiver equalizer, either the equalization signal of the feedback filter or the estimated equalization signal of the maximum likelihood sequence estimator according to a bandwidth related to the approximate channel response characteristic.

7. The method of claim 6, wherein, in a case where the bandwidth related to the approximate channel response characteristic is smaller than that of a reference bandwidth, the final equalization signal is output as the equalization signal of the feedback filter, and
   in a case where the bandwidth is greater than or equal to that of the reference bandwidth, the final equalization signal is output as the estimated equalization signal.

8. The method of claim 7, wherein the reference bandwidth is determined based on a first correlation between the filter coefficient and a bit error rate (BER) for the equalization signal of the feedback filter and a second correlation between the filter coefficient and a BER for the estimated equalization signal of the maximum likelihood sequence estimator.

9. The method of claim 8, wherein, in the case where the bandwidth is smaller than that of the reference bandwidth, the filter coefficient is determined based on the first correlation.

10. The method of claim 8, wherein, in the case where the bandwidth is greater than or equal to that of the reference bandwidth, the filter coefficient is determined based on the second correlation.

11. A transmitter equalizer comprising:
    a precoder,
    wherein the precoder comprises:
    a single tap for receiving a transmission feedback signal based on an input signal; and
    a filter operator for generating a pre-equalization signal by filtering the transmission feedback signal and removing precursor inter-symbol interference (ISI) of the transmission feedback signal, and
    a filter coefficient to be applied to the filter operator is determined according to an approximate channel response characteristic,
    wherein the filter coefficient increases as a bandwidth related to the approximate channel response characteristic decreases, and decreases as the bandwidth increases.

12. The transmitter equalizer of claim 11, wherein the precoder is configured to serve as a pre-equalizer implemented with 2-tap Tomlinson-Harashima Precoding (THP).

13. The transmitter equalizer of claim 11, wherein the approximate channel response characteristic is the bandwidth of a system comprising the transmitter equalizer and a receiver equalizer, or is an auxiliary coefficient of a filter corresponding to the predetermined tap in a feedback filter for responding to a training signal from the transmitter equalizer, and
    the filter coefficient is set to any one of a plurality of fixed values and determined as a fixed value closest to a value obtained based on the approximate channel response characteristic.

14. A receiver equalizer comprising:
    a feedback filter,
    wherein the feedback filter is composed of multi-tap filters, and generates an equalization signal by removing postcursor inter-symbol interference (ISI) of a transmission signal received from a transmitter equalizer provided with a 2-tap precoder using a filter coefficient, and
    an auxiliary coefficient of a filter operation applied to each multi-tap filter is set to compensate for a difference between an overall channel response of the transmission signal and a channel response based on the transmitter equalizer.

15. The receiver equalizer of claim 14, wherein the feedback filter is configured to serve as a decision feedback equalizer having the multi-tap filters,
    the transmitter equalizer is configured with a pre-equalizer implemented by 2-tap Tomlinson-Harashima Precoding (THP) using the filter coefficient, and
    the auxiliary coefficient is set for each tap of the multi-tap filters on the basis of a training response signal transmitted from the transmitter equalizer in a state where the filter coefficient is determined.

16. The receiver equalizer of claim 14, further comprising:
a maximum likelihood sequence estimator for receiving the equalization signal and generating an estimated equalization signal,
wherein the receiver equalizer outputs, as a final equalization signal, either the equalization signal of the feedback filter or the estimated equalization signal of the maximum likelihood sequence estimator according to a bandwidth related to an approximate channel response characteristic.

17. The receiver equalizer of claim 16, wherein, in a case where the bandwidth related to the approximate channel response characteristic is smaller than that of a reference bandwidth, the final equalization signal is output as the equalization signal of the feedback filter, and in a case where the bandwidth is greater than or equal to that of the reference bandwidth, the final equalization signal is output as the estimated equalization signal.

18. The receiver equalizer of claim 17, wherein the reference bandwidth is determined based on a first correlation between the filter coefficient and a BER for the equalization signal of the feedback filter and a second correlation between the filter coefficient and a BER for the estimated equalization signal of the maximum likelihood sequence estimator.

19. The receiver equalizer of claim 18, wherein, in the case where the bandwidth is smaller than that of the reference bandwidth, the filter coefficient is determined based on the first correlation, and
in the case where the bandwidth is greater than or equal to that of the reference bandwidth, the filter coefficient is determined based on the second correlation.

* * * * *